United States Patent [19]

May

[11] 4,454,417

[45] Jun. 12, 1984

[54] HIGH RESOLUTION LIGHT PEN FOR USE WITH GRAPHIC DISPLAYS

[75] Inventor: George A. May, R.R. 1, E. Sooke Rd., Sooke, British Columbia, Canada, V0S 1N0

[73] Assignee: George A. May, Sooke, Canada

[21] Appl. No.: 346,368

[22] Filed: Feb. 5, 1982

[51] Int. Cl.³ ............................................. G06K 9/00
[52] U.S. Cl. .................... 250/216; 340/707; 350/415
[58] Field of Search ........ 250/216, 227, 555, 566–568; 235/471, 472, 473; 340/706–708; 350/415, 562

[56] References Cited

U.S. PATENT DOCUMENTS

| | | |
|---|---|---|
| 2,552,238 | 5/1951 | Turner et al. ................ 350/415 X |
| 3,271,515 | 9/1966 | Harper . |
| 3,320,671 | 5/1967 | Rickert et al. ................ 350/562 X |
| 3,497,701 | 2/1970 | Dalton .......................... 250/227 X |
| 3,505,561 | 4/1970 | Ward et al. . |
| 3,512,037 | 5/1970 | Eckert et al. . |
| 3,543,240 | 11/1970 | Miller et al. . |
| 3,569,617 | 3/1971 | Allen et al. . |
| 3,599,003 | 8/1971 | Price et al. ................... 250/227 X |
| 3,668,312 | 6/1972 | Yamamoto et al. . |
| 3,801,740 | 4/1974 | Buzzard et al. . |
| 3,835,245 | 9/1974 | Pieters . |
| 3,917,955 | 11/1975 | Inuiya . |
| 3,944,988 | 3/1976 | Mayer . |
| 4,017,680 | 4/1977 | Anderson et al. . |
| 4,053,765 | 10/1977 | Kuffer ................................. 250/227 |
| 4,109,146 | 8/1978 | Hillman ............................. 250/227 |
| 4,116,529 | 9/1978 | Yamaguchi . |
| 4,367,465 | 1/1983 | Mati et al. . |

FOREIGN PATENT DOCUMENTS 2628709  12/1977  Fed. Rep. of Germany .

OTHER PUBLICATIONS

Bilsback, "Light Pen", IBM Technical Disclosure Bulletin, vol. 15, No. 8, pp. 2522–2523, Jan. 1973.

Primary Examiner—David C. Nelms
Assistant Examiner—Edward P. Westin
Attorney, Agent, or Firm—Majestic, Gallagher, Parsons & Siebert

[57] ABSTRACT

A high resolution light pen comprises a collimation tube slidably mounted within a housing. The collimation tube includes an axially extending channel having a non-reflective surface. A photodetector is fixably mounted within the housing aligned with the channel. A lens is mounted adjacent to the front end of the channel and has a focal length equal to the spacing between the lens and an aligned pixel of the video screen. By this arrangement, all light rays emanating from an aligned pixel and passing through the lens are refracted axially along the channel and directed to the photodetector thereby maximizing the input thereto. The light pen further includes a discrimination circuit which generates computer interrupt signals for reading an address counter. The discrimination circuit generates an interrupt signal when the signal from the photodetector is valid. The interrupt signal is generated at a time which is substantially independent of the slope of the signals thereby reducing the effects of jitter.

13 Claims, 5 Drawing Figures

HIGH RESOLUTION LIGHT PEN FOR USE WITH GRAPHIC DISPLAYS

BACKGROUND OF THE INVENTION

The subject invention relates to a new and improved light pen for use with graphic displays. More particularly, a light pen is disclosed having a new and improved optical design for use in conjunction with unique electrical circuitry, which provides high resolution and substantially reduces the effects of jitter.

In the prior art, light pens have been used as a pointer device in association with computer controlled, cathode-ray tube video displays. It is an object about the size and shape of a fountain pen and includes a means for sensing light and a means for converting this light into an electrical pulse. The pen is held in the hand and pointed at some portion of a picture, symbol or the like being displayed on the screen of the cathode-ray tube. When the electron beam which is tracing the image causes a portion of the screen next to the point of the pen to light up, the pen senses this light and generates an electrical pulse which serves as a computer interrupt signal. Typically, the computer circuitry responds to the interrupt signal by reading an address counter having data which tracks the position of the cathode ray at that particular moment. The address in the counter corresponds to the location of the light pen.

The accuracy or resolution of the light pen is affected by a number of factors. One of the primary factors relates to the optics of the light pen itself. A light pen typically includes an elongated channel for directing light rays emanating from the video screen to a photodetector within the light pen. One example of a light pen can be found in U.S. Pat. No. 3,569,617 issued Mar. 9, 1971 to Allen. The light pen disclosed in the Allen patent includes a collimation tube having an internal channel with non-reflective walls. The light pen will only accept light rays emanating from the video screen which are axially aligned with the channel. Non-axial light rays emitted from the screen are either not received through the channel opening or absorbed by the non-reflective walls of the channel.

Various other light pens have been developed which include a lens for focusing the axially received light. Examples of such pens can be found in U.S. Pat. No. 3,271,515 issued Sept. 6, 1966 to Harper, U.S. Pat. No. 3,599,003 issued Aug. 10, 1971 to Price and U.S. Pat. No. 3,917,955 issued Nov. 4, 1975 to Inuiya. All of the light pens disclosed in the latter patents include a single lens which is used primarily to focus axially received light rays onto a photodetector. Each of these devices are limited to detecting light rays which travel along the longitudinal axis of channel. Accordingly, it is necessary to provide the channel with a large diameter so that light rays from a number of pixels on the video screen will be accepted. Only in this manner will the number of light rays received by the photodetector be sufficient to generate a pulse. The above described configuration is acceptable when the light pen is used merely to define areas on the video screen. However, for more sophisticated applications, higher resolution would be desirable. More specifically, in applications such as on screen drawing, it is necessary to be able to detect light from individual pixels. In the latter situation, the channel of the light pen must be restricted to a diameter less than the width of two pixels such that only light rays emanating a single pixel are received by the photodetector. Thus it would be desirable to provide an improved optical system for maximizing the reception of light rays emanating from a single pixel such that they may be adequately sensed by the photodetector.

Another shortcoming of the prior art light pens relates to the mechanical means utilized to actuate the device. Frequently, separate independent triggering means are provided on the light pen for providing an actuation signal to the computer. Switch means of the latter type are disclosed in the patents to Harper and Price cited above. However, to facilitate the use of the light pen, it is preferable to provide some form of automatic switching. For example, in the above cited patent to Allen, the collimation tube is slidably mounted within an outer housing. When the user presses the collimation tube against the video screen, a miniature switch in the rear of the housing is actuated, signaling the computer. Similarly, in the patent to Inuiya, a collimation tube is slidably mounted within the housing and connected to an internal switch. In the Inuiya device, the photodetector is mounted on the movable collimation tube. Accordingly, in order to electrically connect the photodetector, wires must be affixed to the movable members. Similarly, in the patent to Allen, electrical connections are made through the movable member. In addition, in the Allen device, a fiber optics bundle is also connected through the collimation tube. As can be appreciated, the actuation of either of these light pens results in the repeated movement of the connection means which frequently leads to the failure of the device due to the breakdown of the connectors. Accordingly, it would be desirable to provide a new and improved light pen which includes an automatic actuation means that does not require the movement of electrical connections thereby reducing the likelihood of breakdown.

As discussed above, when the photodetector of the light pen is actuated, it generates an interrupt signal which typically causes the computer to read a counter having an address corresponding to the location of the cathode ray. Theoretically, if the interrupt signal were generated simultaneously upon the excitation of the phosphor of the pixel, the location of the light pen could be accurately determined. However, in practice, this result has been difficult to achieve. More particularly, the light rays from an excited pixel that are received by the light pen cause a pulse to be generated having an amplitude which varies according to the intensity of the light received. For example, if the light pen is positioned directly over the desired pixel, the intensity will be maximized and the amplitude of the pulse which is generated by the photodetector will be fairly high. In contrast, if the light pen is not directly aligned with a pixel, the intensity of the light rays received will be reduced such that a pulse having a relatively smaller amplitude will be generated.

While the amplitude of a pulse varies with intensity, the "rise time" of all pulses is constant. Rise time is defined as the length of time it takes for the amplitude of a pulse to rise from 10 percent of maximum to 90 percent. The rise time of a system is governed by factors such as the tracking speed of the video beam and the type of phosphor used. The problems of detection occur because pulses having the same rise time but different amplitudes will have different slopes. For example, since a large amplitude pulse will reach a maximum value in the same time period as a smaller pulse, the slope of the larger pulse must be greater. Measurement uncertainties arise because pulses having different slopes will exceed detection threshold limits at different times.

Light pens are generally provided with discrimination circuitry to determine if a pulse generated by a photodetector validly represents an excited pixel. Typically, each pulse is compared to a threshold voltage level to determine if the pulse is valid. In order to generate accurate position data, the time between the start of a pulse and the point at which it crosses the threshold level must be constant for all pulses. However, as mentioned above, the time it takes an incoming pulse to exceed the threshold level will vary with the amplitude, which is in turn dependent upon the intensity of the light received by the photodetector. Accordingly, for an aligned pixel, where the amplitude of the pulse is large and the slope is great, the interrupt signal will be generated fairly quickly. However, if the light pen is not directly aligned with the pixel, a pulse having a smaller amplitude and a shallower slope is produced such that the interrupt signal will be generated at a later time.

This timing uncertainty is the cause of jitter. More particularly, the interrupt signal generated by the light pen causes a counter to be read having an address corresponding to the position of the light pen. However, the time the interrupt signal is generated is a function not only of the light pen position, but of the intensity of the light rays received. For example, since a non-aligned pixel will produce a slower rising pulse that exceeds the threshold level at a later time, the address counter will advance beyond the point which would occur with an aligned pixel. Thus, a slight displacement of the light pen can cause the computer to generate a substantially different address.

Jitter may occur even if the light pen is held stationary relative to the video screen. More particularly, the scanning position of the cathode ray includes a predictable amount of error such that in one sweep the ray might be directly aligned with the light pen while on the next sweep it might be slightly off alignment. Accordingly, even if the light pen is held stationary, the interrupt signals used to produce the location data will vary depending upon the alignment of the excited pixel.

In many prior art applications, this jitter effect is not a major disadvantage. For example, light pens are frequently used merely to point to an area on the video screen. Accordingly, precise data regarding the position of the light pen is not necessary since a location determination anywhere within the field was sufficient. However, in other applications, there is a need for a more accurate light pen. For example, if the light pen were to be used for real time drawing, the precise location of each light pen hit must be determined in order to define continuous line segments.

One example of the prior art circuitry utilized to provide more accurate location data can be found in U.S. Pat. No. 3,512,037 issued May 12, 1970 to Eckert et al. The Eckert patent discloses a fairly complex two step scanning system wherein a first scan is used to obtain the gross position data. Thereafter, a second scan is used to disclose horizontal and vertical tangent points. As can be appreciated this two step scan system is complex and difficult to use. More importantly, it requires that the cathode-ray tube perform special searching techniques. Therefore, this method could not be used where the cathode-ray tube was operating in a standard fashion. Accordingly, it would be desirable to provide new and improved discrimination circuitry that is capable of providing accurate position data of the light pen.

SUMMARY OF THE INVENTION

Accordingly, it is an object of the subject invention to provide a new and improved light pen for use with graphic displays.

It is another object of the subject invention to provide a light pen having a new and improved optical construction for enhanced resolution capabilities.

It is a further object of the subject invention to provide a new and improved light pen wherein the electronic connections are stationary thereby preventing wear.

It is still another object of the subject invention to provide a new and improved discrimination circuit for use with a light pen which reduces the effects of jitter.

It is still a further object of the subject invention to provide new and improved discrimination circuitry for use with a light pen wherein an interrupt signal is generated if the input pulse is valid and exceeds a threshold level, with the time of the interrupt signal being independent of the amplitude of the input pulse.

In accordance with these and many other objects, the subject invention provides for a high resolution light pen for sensing light rays emitted from a pixel on a video screen. The light pen includes a collimation tube slidably mounted in an elongated cylindrical housing. The collimation tube includes a cylindrical channel extending along the longitudinal axis thereof. The inner surface of the channel is non-reflective. A photodetector is fixably mounted within the housing to the rear of the collimation tube and aligned with the channel thereof.

In accordance with the subject invention, a lens is disposed within the channel of the collimation tube adjacent the front end thereof. The focal length of the lens is defined to maximize the gathering of light rays from the pixel for transmission to the photodetector. More particularly, and as described more fully herein below, the focal length of the lens corresponds to the distance between the lens and the virtual image of the pixel in the video screen when the light pen is placed against the screen. By this arrangement, all light rays emanating from an aligned pixel and passing through the lens are refracted axially along the channel and directed to the photodetector. Accordingly, a far higher percentage of light rays from the pixel are received by the photodetector than in the light pens of the prior art wherein only light rays which are originally parallel to the channel are detected. Another advantage of the subject light pen is that any light rays which emanate from a source other than an aligned pixel that pass through the lens are refracted at an angle causing them to be absorbed by the non-reflective surface of the channel.

In the prefered embodiment in the subject invention, a second lens is provided at the rear of the channel for focusing the parallel light rays directly onto the photodetector for maximizing the input thereto. A switch may be mounted within the housing, behind the collimation tube, in a position such that once the light pen is pressed against the video screen, the collimation tube is movable rearwardly to actuate the switch. In the subject light pen, only the optical collimation tube is movable such that electronic connections are not subject to wear.

The subject invention further includes new and improved discrimination circuitry for generating interrupt signals independent of the amplitude of the pulses. More specifically, each light pen hit generates a pulse which is amplified and then tested to determine if it exceeds an upper threshold level thereby indicating it is a valid pulse. As discussed above, the time it takes for the pulse to reach the threshold level will vary according to the intensity of the pulse. In order to narrow this uncertainty, the timing of the hit is derived from an early stage of the pulse. Accordingly, each pulse is also compared with a lower threshold level. With pulses having an amplitude exceeding four or more times the lower threshold level, the time it takes for any pulse to cross the lower threshold is fairly similar. Thus, the effects of jitter can be substantially reduced by basing the timing of the interrupt signal on the front edge crossing of a lower threshold level and accepting the pulse for output if it also exceeds the higher threshold. By subjecting each pulse to two levels of discrimination, the accuracy of the location determination can be substantially increased.

Further objects and advantages of the subject invention will become apparent by referring to the following detailed description in conjunction with the drawings in which:

DETAILED DESCRIPTION OF THE PREFERRED EMBODIMENTS

Figure 1:
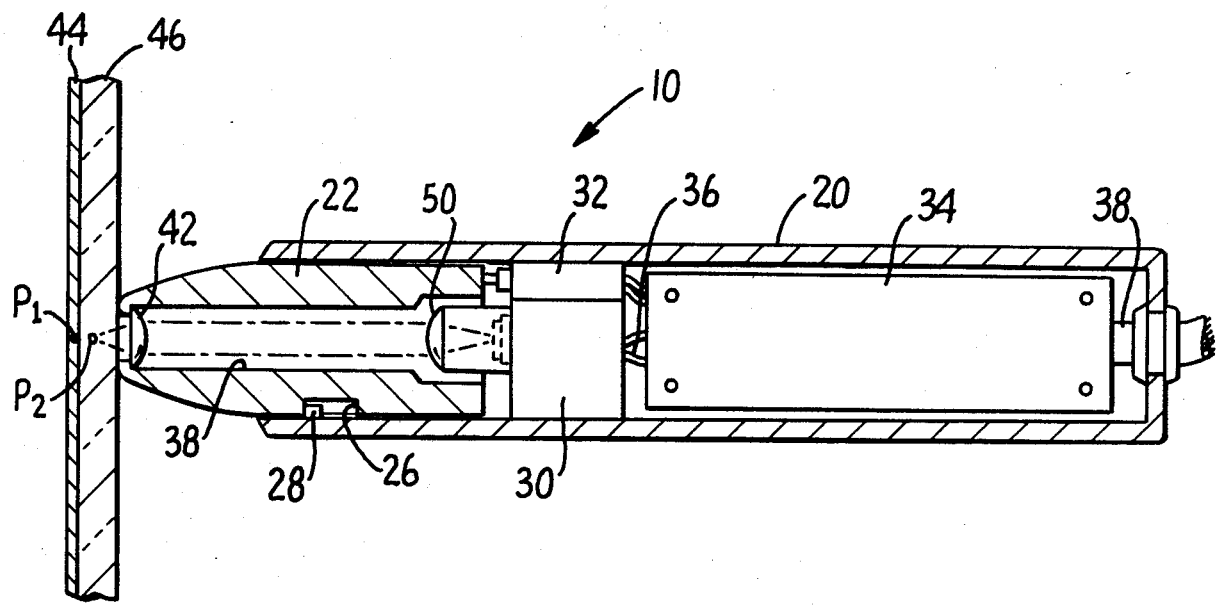
FIG. 1 is a cross-sectional view of the new and improved light pen of the subject invention.
Figure 2:
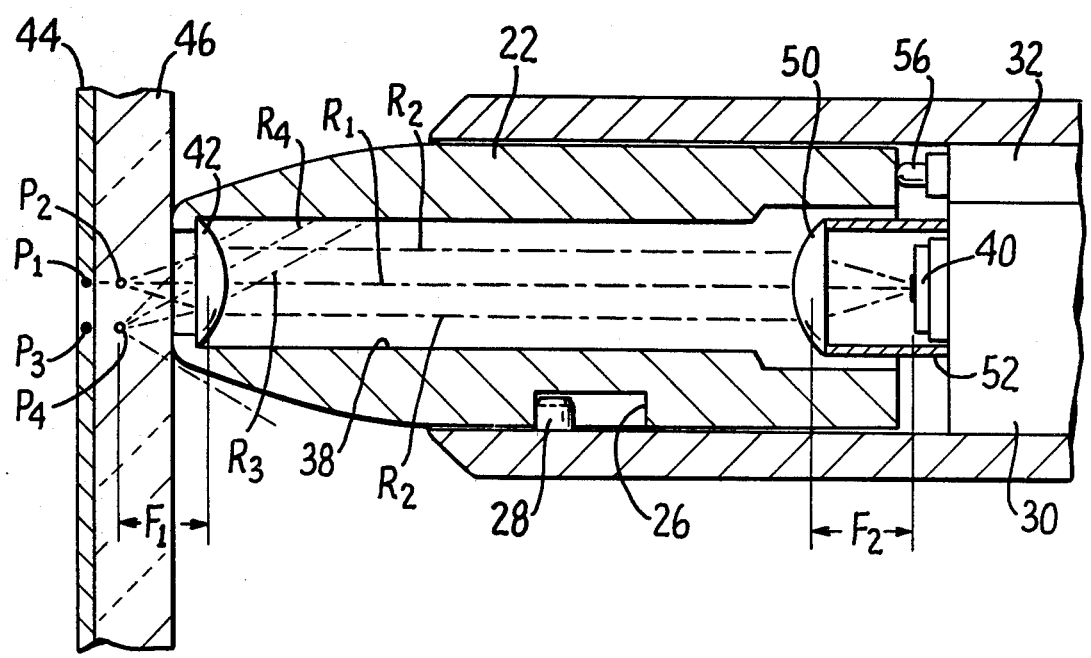
FIG. 2 is an enlarged cross-sectional view illustrating the optics of the new and improved light pen of the subject invention.

Referring to FIGS. 1 and 2, the light pen 10 of the subject invention is illustrated. The light pen 10 includes an elongated cylindrical housing 20 adapted to contain the optical and electrical elements. A cylindrical collimation tube 22 is slidably mounted within the front end of housing 20. Preferably, a recess 26 is provided for receiving a stop pin 28 fixably mounted to the inner surface of the housing 20. The combination of the recess 26 and the stop pin 28 functions to restrict the movement of the collimation tube relative to the housing, with regard to both the length and direction of travel. In the preferred embodiment, the movement of the tube is limited to a direction parallel to the longitudinal axis of the housing.

The light pen 10 includes a photodetector means 30 mounted to the rear of the collimation tube 22. A miniature switch 32 is also disposed adjacent the rear of the collimation tube. The remainder of the light pen housing is adapted to contain circuitry 34 for acting upon the signals received by the photodetector 30. Electrical cables 36 and 38 are provided to connect the circuitry 34 to the photodetector and supporting computer respectively.

The light pen 10 of the subject invention is a high resolution device capable of focusing on an individual pixel of a video screen. This unique result is achieved at relatively low cost due to the new and improved optical construction of the light pen. Referring more particularly to FIG. 2, it will be seen that collimation tube 22 includes a cylindrical channel 38 extending along the longitudinal axis thereof. Preferably, the diameter of the channel 38 is related to the spacing between pixels on the screen and is on the order of 1.5 times the pixel width. The inner surface of the collimation tube is coated with a non-reflective material such that any light rays which intersect with the coating are absorbed rather than reflected. Channel 38 is aligned with sensor 40 of photodetector means 30.

In accordance with the subject invention, a lens 42 is mounted within the channel 38 of the collimation tube adjacent the front end thereof. Due to the unique construction of lens 42, all light rays entering the lens from an aligned pixel are refracted and directed axially along the channel. In order to construct the proper configuration of the lens the location of the virtual image of the pixel must be calculated. As illustrated in FIG. 2, the pixels ($P_1$ and $P_3$) are actually located in a phosphor layer 44 behind glass screen 46. However, due to the refraction of light caused by the glass screen, the image of each pixel appears to be located within the glass 46. This effect is similar to the apparent location of an object at the bottom of a body of water. The specific location of the virtual image within the glass screen 46 is a function of a number of factors including the thickness of the glass and its refractive index. Thus, in order to focus on a particular pixel, lens 42 must be configured to focus on the apparent source ($P_2$ and $P_4$) of the light rays rather than the actual source of light.

In accordance with the subject invention, the focal length $F_1$ of lens 42 is intended to be equal to the distance between the lens and the virtual image $P_2$ of the pixel when the light pen is pressed against the front surface of screen 46. This relationship enables the subject light pen to capture a far greater percentage of light rays emanating from the virtual image $P_2$ of the pixel then the light pens known in the prior art. More particularly, and as discussed above, light pens in the prior art were only capable of capturing light rays which emanated parallel to the channel of the collimation tube. As illustrated by light ray $R_1$ emanating from pixel $P_2$, the subject light pen will similarly capture any light rays emanating parallel to the longitudinal axis of channel 38. In addition, the subject light pen will also capture light rays which emanate at an angle relative to the longitudinal axis of the channel 38, as illustrated by rays $R_2$. As can be appreciated, since the virtual image $P_2$ of pixel $P_1$ is located at the focal point of the lens 42, rays $R_2$ which emanate at an angle and enter lens 42 are refracted into a path parallel to the longitudinal axis of channel 38. Thus, all rays which emanate from the virtual image $P_2$ and pass through lens 42 can be captured and transferred to the photodetector.

In contrast, light rays emanating from pixels which are not aligned with the channel 38 and which enter lens 42 are absorbed by the collimation tube. As illustrated in FIG. 2, light from pixel $P_3$ apparantly emanates from source $P_4$. The latter light rays (shown as $R_3$ and $R_4$) are refracted by lens 42 such that they will intersect and be absorbed by the inner surface of housing 38.

In order to maximize the reception of light rays at the photodetector, a focusing lens 50 may also be provided. Focusing lens 50 is mounted to the photodetector using a casing 52. The focal length $F_2$ of lens 50 is equal to the spacing between the lens and the surface of sensor 40 of photodetector 30. Accordingly, as illustrated in FIG. 2, all parallel light rays entering lens 50 will be focused directly on the center of sensor 40. By this arrangement, any stray light rays which are not fully absorbed by the internal surface of channel 38 will be refracted away from the photodetector by lens 50 thereby minimizing spurious signals. Preferably, the diameter of the rear end of channel 38 is widened to accommodate casing 52.

One advantage of the subject construction is that the length of the collimation tube 38 is not critical. More particularly, since lens 50 will focus only parallel light rays, it can be positioned at any distance from lens 42. The length of the collimation tube should be long enough to permit the absorption of all non-aligned light rays. When used with a typical size video matrix, the collimation tube 38 can have a length on the order of three centimeters.

In the preferred embodiment of the subject invention, switch 32 is provided with a spring biased member 56 which is disposed adjacent the rear-end of collimation tube 22. In the inactive condition, the spring action of the member 56 biases the collimation tube into its maximum forward position. In use, the operator presses the collimation tube against the front surface of the screen 46 causing the collimation tube to move rearwardly relative to the housing 20. The rearward movement of the collimation tube 22 causes member 56 to move rearwardly, activating the circuits within the light pen. Preferably, a switch 32 is selected which creates an audible click and a tactile locking sensation to inform the operator that the circuit has been activated. As discussed above, the combination of recess 26 and stop pin 28 controls the movement of collimation tube within the housing. In FIG. 2, the light pen is depicted in its rearward, activated position within the housing.

The mechanical switching arrangement of the subject light pen functions to reduce the likelihood of breakdown from frequent use. More particularly, all of the electrical controls are fixably mounted to the housing, and only the collimation tube is mounted for slidable movement. Thus, the repeated movement of the collimation tube does not cause any movement of electrical wiring or optical bundles as disclosed in the prior art. Accordingly, the subject light pen is easy to use and is long lasting. Further, the subject pen is capable of high resolution and maximizes the light received at the photodetector.

Figure 3:
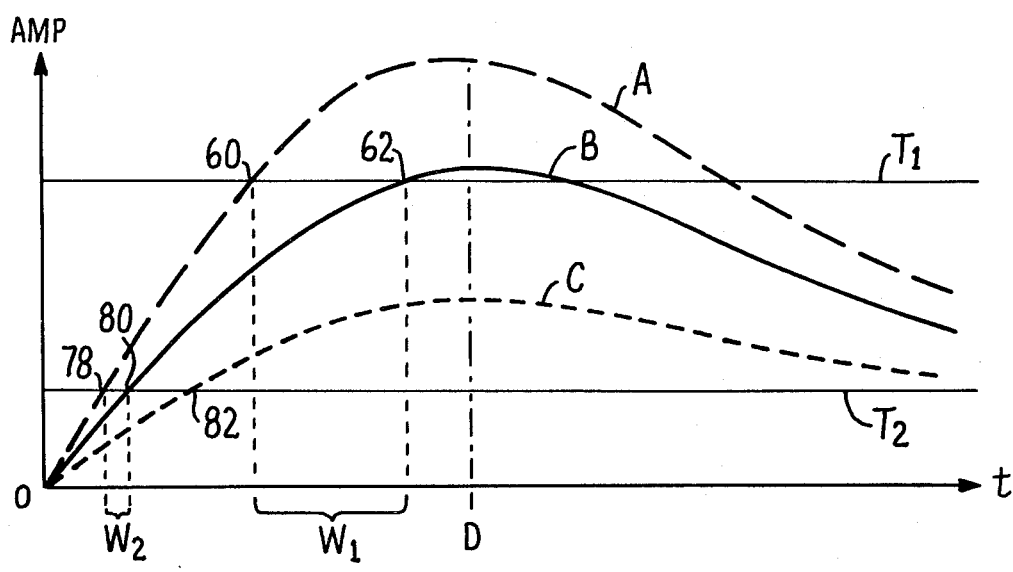
FIG. 3 is a graphical representation of the amplitude of input pulses generated by a light pen.
Figure 4:
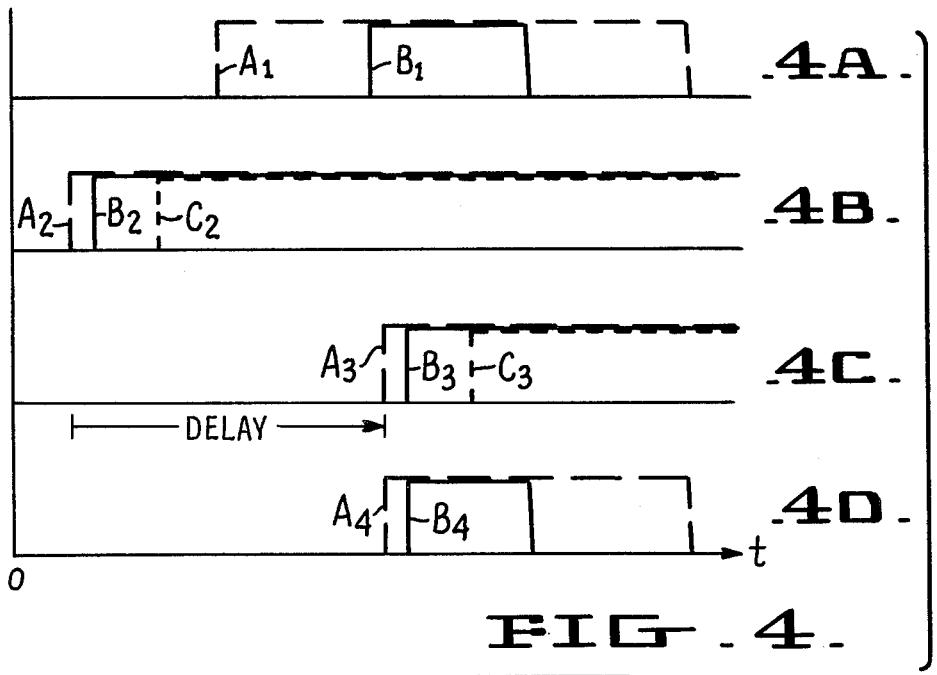
FIG. 4 is a graphical representation of the output pulses produced using the new and improved discrimination circuit of the subject invention.
Figure 5:
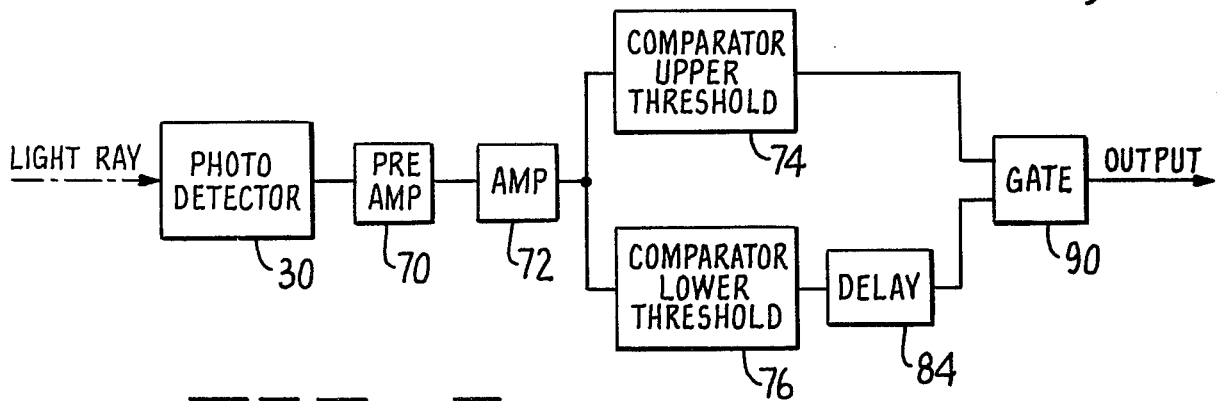
FIG. 5 is a block diagram of the new and improved discrimination circuit of the subject invention.

Referring now to FIGS. 3 through 5, the discrimination circuitry of the subject light pen will described in more detail. Preferably, the circuitry is mounted within the light pen rather than at the computer control to eliminate spurious signals caused by such factors as high frequency noise.

As mentioned above, one of the major shortcomings of the prior art light pen circuitry relates to the effects of jitter. The jitter phenomenon may be more readily understood with reference to FIG. 3, where the horizontal axis represents time, and the vertical axis represents the voltage amplitude of incoming pulses. The curves which are illustrated represent the voltage generated by the photodetector in response to the reception of light rays.

A video screen may be thought of as an array of horizontal lines illuminated by the sweeping motion of the cathode ray. When the light pen is placed on the video screen it will detect light emitted from the phosphor excited by the cathode ray. The cathode ray takes a finite period of time to sweep through the field of the light pen. The tracking speed of the cathode ray, along with the type of phosphor utilized, contributes to the particular rise time of the video system. As noted above, the rise time is defined as the length of time it takes for the amplitude of a pulse to rise from 10 percent of maximum to 90 percent. As illustrated in FIG. 3, each of the pulses labeled A, B, and C reach a maximum point at approximately the same time indicated by line D.

The amplitude of the pulses is governed by the intensity of the light rays received by the light pen. When the light pen is placed on the video screen in direct alignment with one of the lines traced by the cathode ray, a pulse having a maximum amplitude, as illustrated by curve A in FIG. 3, will be produced. In contrast, if the light pen is placed on the video screen in a location displaced slightly from one of the lines traced by the cathode ray, a pulse having a lower amplitude will be generated, as illustrated by curve B in FIG. 3.

Pulses having varying amplitudes will be generated even if the light pen is held stationary with respect to the video screen. More particularly, the tracking of the cathode ray is subject to error such that the degree of alignment with the light pen will vary with each sweep. Accordingly, pulses varying in amplitude will be generated which, in the prior art, resulted in measurement uncertainties. Curve C, illustrated in FIG. 3 is a low amplitude pulse representing a stray signal from a pixel not aligned with the field of the light pen. Discrimination circuitry must be capable of rejecting the latter type of low amplitude pulse as an invalid signal.

Since each of the pulses illustrated in FIG. 3 have different amplitudes, but identical rise times to maximum, their slopes must be different. For example, pulse A, having a maximum amplitude, has a relatively steep initial slope. In contrast, curve B, having a lower amplitude has a relatively shallower slope. As pointed out above, measurement uncertainties arise because pulses having different slopes will exceed detection threshold limits at different times.

Typically, in the prior art discrimination circuitry, the amplitude of a pulse is compared to an arbitrarily set threshold level depicted as $T_1$ in FIG. 3, to determine if the pulse is a valid signal. More specifically, unless the pulse exceeds the threshold level $T_1$, it is assumed that the pulse is merely a spurious signal generated, for example by a pixel near to, but not aligned with the light pen. As seen in FIG. 3, pulse A, having a relatively steep slope, exceeds threshold level $T_1$ at point 60. Pulse B, having a relatively shallower slope, does not exceed threshold level $T_1$ until point 62. Pulse C, representing an invalid signal never exceeds threshold level $T_1$.

In the prior art, when a pulse exceeds threshold level $T_1$, an interrupt signal is generated causing an address in a counter to be read which represents the location of the cathode ray at that time. By this arrangement, the position of the light pen is determined. As illustrated in FIG. 3 however, while pulses A and B began at the same point of origin 0, they exceed threshold level $T_1$ at different times. More particularly, pulse B exceeds threshold $T_2$ a time period $W_1$ after pulse A. Accordingly, the address counter in the computer, tracking the movement of the cathode ray will be permitted to advance such that the circuitry is supplied with an incorrect light pen position. This timing discrepancy is the cause of jitter.

As can be appreciated, a finite time period will elapse between the origin 0 of pulse A and the point 60 at which the pulse crosses threshold level $T_1$. Further, since electronic communications are not truly instantaneous, a finite time period will elapse between time the curve crosses threshold $T_1$ and the address counter is actually read. Accordingly, the address in the counter does not actually correspond to the position of the light pen. Rather, when the counter is read, the address therein exceeds the actual position of the light pen by a fixed amount. This known time difference can be compensated for by logically subtracting a fixed number from the address counter to obtain the actual light pen position. However, the timing uncertainty caused by variations in amplitude is not constant and cannot be corrected, and results in jitter.

In the prior art, the random timing error, illustrated as $W_1$ in FIG. 3, is generally a minimum of 100 nanoseconds which corresponds to an approximately 1.5 pixel error. In contrast, the subject invention provides new and improved circuitry wherein the jitter effects can be reduced to between 20 and 40 nanoseconds corresponding to a 0.5 pixel spacing that effectively permits discrimination of exact pixels.

In accordance with the subject invention, each incoming pulse is tested against an upper threshold level $T_1$ to determine if that pulse is valid. Further, each pulse is also tested against a substantially lower threshold $T_2$ to provide more accurate information regarding the timing of the pulses. The subject circuitry takes advantage of the fact, as seen in FIG. 3, that the paths of pulses of varying intensity are fairly similar in their early stages and diverge over time due to the differences in slopes. Thus, the spacing or timing difference $W_2$, between valid pulses A and B when crossing a lower threshold $T_2$ (points 78 and 80 respectively), is substantially less than the spacing $W_1$ when the same pulses cross the higher threshold $T_1$.

It is apparent that the lower threshold level $T_2$ could not be utilized alone to determine the validity of pulses since this would result in the acceptance of spurious signals. For example, pulse C, representing a spurious pulse, crosses threshold level $T_2$, at point 82. Thus, if threshold level $T_2$ alone were used to test validly, pulse C would be improperly accepted as valid. Therefore, the determination of validity of the pulse must be based on a comparison at a higher threshold level represented by $T_1$. Accordingly, in the subject circuitry, only pulses which exceed the upper threshold level $T_1$ are accepted as valid pulses, while the lower threshold level $T_2$ is utilized as a timing mechanism for reducing the effects of jitter.

Referring to FIGS. 4 and 5, the circuits of the subject invention and its operation will be more fully described. As illustrated in the block diagram of FIG. 5, the output of photodetector 30 is supplied to two amplification stages 70 and 72 respectively. Preferably, the preamplifier 70 has a differential output while amplifier 72 has both a differential input and output. The two amplification stages are intended to provide a gain of between 200 and 400. By this arrangement the voltage generated by the photodetector 30 can be boosted to approximately one-half volt or more.

The output of amplifier 72 is supplied to a first comparator means 74 which determines if the pulse is a valid signal. Comparator 74 is configured to output a first signal when the input voltage exceeds the upper threshold level $T_1$. Referring to FIG. 4A, the type of output of the first comparator means 74 is shown, when supplied with the input pulses illustrated in FIG. 3. Thus, for pulse A, a first signal $A_1$, will be generated beginning when pulse A crosses the upper threshold $T_1$ at the point 60. Similarly, a signal $B_1$ is generated when pulse B crosses upper threshold $T_2$ at point 62. The signals $A_1$ and $B_1$ will remain high for as long as the amplitude of the associated input pulses exceed threshold level $T_1$. As discussed above, the time difference $W_1$ between the initiation of signals $A_1$ and $B_1$ corresponds to the jitter effects of the prior art.

In order to reduce this jitter, the subject invention includes a second comparator means 76 which tests the incoming pulses against a substantially lower threshold level $T_2$. Comparator 76 is configured to initiate a second signal when the incoming pulse exceeds the lower threshold level $T_2$. FIG. 4B illustrates the output of second comparitor 76 when supplied with the pulses illustrated in FIG. 3. More particularly, second signal $A_2$, is generated when pulse A crosses the lower threshold $T_2$ at point 78. Similarly, signal $B_2$, is generated when pulse B crosses threshold $T_2$ at point 80. As seen in FIGS. 2 and 3, pulse B crosses threshold level $T_2$ at a fixed time $W_2$ later than pulse A. As discussed above, fixed time interval $W_2$ associated with threshold level $T_2$, is substantially less than the interval $W_1$ associated with upper threshold level $T_1$. This reduction enables the circuit to substantially reduce jitter.

Because comparator 76 is set at a low threshold level, it will generate signals based on pulses which are not valid. For example, since pulse C crosses lower threshold level $T_2$ at point 82, a signal $C_2$, will be generated as seen in FIG. 4B. Since comparator 76 produces signals based on invalid pulses, the information derived therefrom cannot be used solely to determine the validity of pulses. Rather, the signals generated by comparator 76 are combined with those produced by comparator 74 to achieve the desired results.

In accordance with the subject invention, the signals of the second comparator means 76 are supplied to a delay means 84. Delay means 84 may be defined, for example, by a monostable multivibrator. The length of the delay is calculated based on various factors such as the particular threshold levels which have been selected. However, the time period must be sufficiently long enough such that the output of delay means 84 occurs during the time when the pulses have exceeded the upper threshold level $T_1$. FIG. 4C illustrates the output of the delay means when supplied with the signals generated by comparator 76 shown in FIG. 4B. The output ($A_3$, $B_3$ and $C_3$) of delay means 84 is identical in character to the output of comparator 76 except for a uniform delay.

The output from delay means 84 and the output from the first comparator means 74 are then supplied to a gate means 90. Preferably, gate means 90 consists of a logical circuit such as an "and" gate. As well known in the art, an "and" gate will generate a positive going output pulse only when both incoming signals are high. It is to be understood of course, that if it is desired that a low signal be indicative of a valid pulse, a logical "nand" gate could be used wherein a negative going pulse is produced only if both inputs are high.

The output of gate 90 having "and" logic is illustrated in FIG. 4D. More particularly, an output pulse $A_4$, based on input pulse A, will be generated when the signals $A_1$ and $A_3$ from comparator 74 and delay means 84 are simultaneously high. Similarly, an output pulse $B_4$ will be generated when signals $B_1$ and $B_3$ are both high. The spacing between the output pulses $A_4$ and $B_4$ corresponds to the timing interval $W_2$. Gate means 90 will not generate any output pulse for input pulse C since the gate is never supplied with a corresponding signal from comparator 74.

Each output pulse $A_4$, $B_4$ is utilized as an interrupt signal causing the computer to read a counter having an address corresponding to the position of the cathode ray. Because the time difference $W_2$, between pulses $A_4$ and $B_4$, is relatively short, the measurement variations which cause jitter are minimized. Of course, since there has been a delay incorporated in the circuitry, the interrupt signal will occur at a finite time after the origin of each pulse. However since the delay is a fixed value, the timing of the interrupt signal can be logically corrected by subtracting a fixed amount from the counter.

As illustrated in FIGS. 3 and 4, the timing difference $W_2$, between the outputs $A_4$ and $B_4$, is substantially less than the difference $W_1$ between the upper threshold crossings 60 and 62. In practice, the time period $W_1$ is even shorter than illustrated. More particularly, amplifiers, such as those used to boost the incoming pulses, have inherent limitations (referred to as slope limits) which tend to inhibit fast rising pulses. Accordingly, in the early stages of the pulses, the paths of the curves will be virtually coincident thereby substantially eliminating the effects of jitter.

The amount of reduction of jitter can be affected by adjusting the threshold levels $T_1$ and $T_2$. For example, when the upper thresholds level $T_1$ is set at 75% of maximum amplitude and the lower threshold $T_2$ at 50% of maximum, a jitter of 40 nanoseconds can be achieved. When the lower threshold level is reduced to 25% of maximum amplitude, a jitter of only 20 nanoseconds can be achieved. Reduction of jitter to this range corresponds to an error of approximately ±0.5 pixels. By this arrangement, the accurate location of individual pixels can be achieved to permit the use of a light pen in far more demanding applications such as drawing.

In summary, there is provided a new and improved high resolution light pen for use with graphic displays. In addition, a unique circuit is disclosed for determining the validity of incoming pulses and for reducing the effects of jitter. The subject light pen 10 includes a collimation tube 22 slidably mounted within a cylindrical housing 20. The collimation tube includes a cylindrical channel 38 extending along the longitudinal axis thereof. The inner surface of the channel is non-reflective. A photodetector 30 is mounted within the housing in alignment with the channel of the collimation tube. In accordance with the subject invention, a lens means 42 is mounted in the channel adjacent the front end thereof. The focal length of lens 42 is fixed such that it is equal to the spacing between the virtual image of a pixel and the lens, when the light pen is placed adjacent a video screen. By this arrangement, all light rays emanating from the pixel which pass through the lens are refracted along the longitudinal axis of the housing and directed to the photodetector. Light rays from non-aligned pixels which pass through the lens are absorbed by the non-reflective surface of the channel.

In the preferred embodiment of the light pen, a second lens 50 is provided for focusing parallel light beams onto the photodetector. By this arrangement, light received by the photodetector from an aligned pixel is maximized while light from non-aligned pixels, which can give rise to spurious signals, are absorbed. In the preferred embodiment of the light pen, a miniature switch 32 is provided behind the collimation tube which is activated by the rearward movement of the tube as the light pen is pushed against the video screen. Accordingly, light pen switching may be activated without movement of any electrical wires.

The subject invention further includes new and improved discrimination circuit for determining the validity of incoming pulses while eliminating the effects of jitter. The subject circuit includes a first comparator means 74 which receives the input pulses and generates a first signal whenever the voltage exceeds an upper threshold level $T_1$, corresponding to a valid pulse. A second comparator means 76 is provided for generating a second signal when the voltage of the input pulse exceeds a lower threshold level $T_2$. The second signal of the second comparator is delayed and supplied to a gate means 90 along with the first signal. The gate means generates an output pulse whenever it receives the first and second signals simultaneously. The production of the output signal by the gate means is substantially independent of the amplitude of the incoming pulses.

While the subject invention has been described with reference to preferred embodiments, it is apparent that changes and modifications could be made therein by one skilled in the art without varying from the scope and spirit of the subject invention as defined by the appended claims. Further, it is envisioned that the high resolution light pen and discrimination circuitry may be used independently when desired. However, when used in combination, maximum resolution and the elimination of the detrimental effects of jitter are achieved.

What is claimed is:

1. A high resolution light pen for sensing light rays emitted from a pixel on a video screen comprising:
   an elongated cylindrical housing having opposed front and rear ends;
   a collimation tube mounted within the housing and projecting outwardly from the front end thereof, said collimation tube having a cylindrical channel extending along the longitudinal axis thereof, with the inner surface of said channel being nonreflective;
   photodetector means fixedly mounted within said housing to the rear of said collimation tube and axially aligned with the channel thereof; and
   lens means disposed within the channel of the collimation tube adjacent the front end thereof, said lens means having a focal length equal to the distance defined between the lens means and the virtual image of the pixel on the video screen when the front end of the collimation tube is placed against the outer surface of the screen, whereby all light rays emanating from a pixel axially aligned with the channel and passing through the lens means are refracted axially along the channel and directed to said photodetector, while light rays passing through the lens means from a displaced source are refracted at an angle and absorbed by the walls of the channel such that only light rays from an aligned pixel are sensed by said photodetector.

2. A light pen as recited in claim 1 further including a second lens means disposed adjacent the rear end of said channel for focusing said axially directed light rays within said channel directly onto said photodetector means.

3. A light pen as recited in claim 2 wherein said second lens means is fixedly mounted to said photodetector means.

4. A light pen as recited in claims 1, 2 or 3 wherein said collimation tube is slidably mounted within said housing and wherein said light pen further includes a switch means operatively connected to said photodetector, said switch means being disposed behind said collimation tube in a manner such that when the front end of said tube is pressed against the video screen it is moveable rearwardly, relative to said housing, to actuate said switch means.

5. A light pen as recited in claim 4 wherein said collimation tube includes a recess for receiving a stop pin fixedly mounted on said housing, said recess and stop pin combination for restricting the movement of said collimation tube in an axial direction.

6. A high resolution light pen system including a light pen for sensing light rays emitted from a pixel on a video screen and generating input pulses which are tested for validity by a discrimination circuit to reduce jitter, said system comprising:

a collimation tube mounted within the housing and projecting outwardly from the front end thereof, said collimation tube having a cylindrical channel extending along the longitudinal axis thereof, with the inner surface of said channel being nonreflective;

photodetector means fixedly mounted within said housing to the rear of said collimation tube and axially aligned with the channel thereof, said photodetector means generating input pulses in response to the reception of light rays;

lens means disposed within the channel of the collimation tube adjacent the front end thereof, said lens means having a focal length equal to the distance defined between the lens means and the virtual image of the pixel on the video screen when the front end of the collimation tube is placed against the outer surface of the screen such that all rays emanating from a pixel axially aligned with the channel and passing through the lens means are refracted axially along the channel and received by the photodetector;

first comparator means operatively connected to and receiving the input pulses generated by the photodetector means, said first comparator means for generating a first signal whenever the voltage of an input pulse exceeds a first threshold level;

second comparator means operatively connected to and receiving the input pulses generated by the photodetector means, said second comparator means for generating a second signal when the voltage of an input pulse exceeds a second threshold level, said second threshold level being lower than said first threshold level;

delay means connected to said second comparator means for delaying said second signal a fixed amount; and gate means operatively connected to said first comparator means and said delay means, said gate means generating an output pulse whenever said gate means receives the first and second signals from said delay means and said first comparator means simultaneously, to reduce the difference in time at which output pulses are generated by input pulses of different amplitudes all exceeding the first threshold, thereby also reducing jitter.

7. A light pen system as recited in claim 6 further including a second lens means disposed adjacent the rear end of said channel for focusing said axially directed light rays within said channel directly onto said photodetector means.

8. A light pen system as recited in claim 7 wherein said second lens means is fixedly mounted to said photodetector means.

9. A light pen system as recited in claims 6, 7, or 8 wherein said collimation tube is slidably mounted within said housing and wherein said light pen further includes a switch means operatively connected to said photodetector, said switch means being disposed behind said collimation tube in a manner such that when the front end of said tube is pressed against the video screen it is movable rearwardly, relative to said housing, to actuate said switch means.

10. A light pen system as recited in claim 9 wherein said collimation tube includes a recess for receiving a stop pin fixedly mounted on said housing, said recess and stop pin combination for restricting the movement of said collimation tube in an axial direction.

11. A light pen system as recited in claim 6 wherein said gate means comprises a logical "and" circuit such that a positive output pulse is produced only when positive signals are simultaneously received from said first comparator means and said delay means.

12. A light pen system as recited in claims 6 or 11 further including an amplification means connected to both of said first and second comparator means, said amplification means for amplifying said input pulses prior to being supplied to both of said first and second comparator means.

13. A light pen having an end adapted to be abutted against a video screen for detecting the presence of an illuminated pixel located adjacent the abutting end of the pen, comprising:

an elongated housing having opposed front and rear ends and formed with a hollow channel extending therethrough;

a radiation detection device mounted in said housing adjacent the rear end of said channel;

lens means mounted within said channel adjacent the front end thereof, said lens means having a focal length such that when the front end of said pen abuts against the screen, radiation from an illuminated pixel located near the axis of the channel is transmitted along the axis of the channel in a collimated beam to said detection device, while the radiation received from pixels displaced from the axis is directed by said lens towards the sides of the elongated channel and dissipated, whereby said detection device functions to detect the on-axis pixels to the exclusion of the off-axis pixels; and a second lens means disposed adjacent to the rear end of the channel for focusing the axially directed radiation directly onto said radiation detection device.

* * * * *